US012475729B2

(12) United States Patent
Suman et al.

(10) Patent No.: US 12,475,729 B2
(45) Date of Patent: Nov. 18, 2025

(54) DIRECT PART MARKING CODE READING WITH MULTIMODAL OBJECT SENSING

(71) Applicant: Datalogic IP Tech, S.r.l., Bologna (IT)

(72) Inventors: Michele Suman, Ponte San Nicolo' Padova (IT); Simone Tobia, Bologna (IT); Mattia Fabbri, Gatteo (IT)

(73) Assignee: DATALOGIC IP TECH, S.R.L., Bologna (IT)

( * ) Notice: Subject to any disclaimer, the term of this patent is extended or adjusted under 35 U.S.C. 154(b) by 379 days.

(21) Appl. No.: 17/879,542

(22) Filed: Aug. 2, 2022

(65) Prior Publication Data

US 2024/0046678 A1    Feb. 8, 2024

(51) Int. Cl.
| | |
|---|---|
| *G06V 30/19* | (2022.01) |
| *G01B 11/30* | (2006.01) |
| *G01J 3/50* | (2006.01) |
| *G06K 7/10* | (2006.01) |
| *G06K 7/12* | (2006.01) |
| *G06V 30/14* | (2022.01) |
| *H04N 23/56* | (2023.01) |
| *H04N 23/74* | (2023.01) |

(52) U.S. Cl.
CPC ............. *G06V 30/19* (2022.01); *G01B 11/30* (2013.01); *G01J 3/50* (2013.01); *G06K 7/10801* (2013.01); *G06K 7/12* (2013.01); *G06V 30/1431* (2022.01); *H04N 23/56* (2023.01); *H04N 23/74* (2023.01)

(58) Field of Classification Search
CPC .... G06V 30/19; G06V 30/1431; H04N 23/74; H04N 23/56; G01B 11/30; G01J 3/50; G06K 7/10801; G06K 7/12

USPC .......................................................... 348/135
See application file for complete search history.

(56) References Cited

U.S. PATENT DOCUMENTS

| 8,690,063 B2 | 4/2014 | Wang |
| 10,958,897 B2 | 3/2021 | Cheng et al. |

(Continued)

FOREIGN PATENT DOCUMENTS

WO    2006060785    6/2006

OTHER PUBLICATIONS

European Search Report of corresponding European Patent Application No. 23187444.7, dated Jan. 15, 2024.

(Continued)

*Primary Examiner* — James T Boylan
(74) *Attorney, Agent, or Firm* — Cozen O'Connor

(57) ABSTRACT

An optical symbol reading system comprises an image sensor operative to capture an image of a target area, a color-sensing system sensitive to certain colors in the visible spectrum, an illumination system operative to produce various types of illumination based on illumination parameters, and a surface-profiling system arranged to measure distance to multiple points of at least one surface in the target area. The illumination system, the image sensor, and the color-sensing system are arranged such that emitted light from the illumination system, in accordance with a selected type of illumination, is directed towards the target area while a portion of the emitted light is reflected from any object of interest present in the target area and received by the image sensor and the color-sensing system. The type of illumination is selected based on output from the color-sensing system and the surface-profiling system.

19 Claims, 10 Drawing Sheets

(56) References Cited

U.S. PATENT DOCUMENTS

| | | | | |
|---|---|---|---|---|
| 2004/0227948 | A1* | 11/2004 | Debevec | G01N 21/55 |
| | | | | 356/445 |
| 2009/0190831 | A1* | 7/2009 | Van Der Putten | G06V 10/245 |
| | | | | 382/165 |
| 2012/0199655 | A1 | 8/2012 | Fukuba | |
| 2014/0111656 | A1* | 4/2014 | Negro | H04N 25/59 |
| | | | | 348/188 |
| 2017/0244882 | A1* | 8/2017 | Kitajima | H04N 23/74 |
| 2020/0116862 | A1 | 4/2020 | Xu et al. | |
| 2020/0380229 | A1* | 12/2020 | Peruch | G06K 7/1447 |
| 2021/0241478 | A1* | 8/2021 | Putman | G06N 3/04 |
| 2021/0374373 | A1* | 12/2021 | Astvatsaturov | G06K 7/1443 |
| 2023/0114364 | A1* | 4/2023 | Gurevich | G06K 7/10732 |
| | | | | 235/454 |
| 2024/0040264 | A1* | 2/2024 | Astvatsaturov | G06V 10/70 |

OTHER PUBLICATIONS https://www.coming.com/worldwide/en/products/advanced-optics/product-materials/corning-varioptic-lenses/variable-focus-lenses-a-series/varioptic-A-25H.html).

Keselman et al. "Intel RealSesnse Stereoscopic Depth Cameras", pp. 1-10, Oct. 29, 2017.

Rohm Co. Ltd, BH1749NUC "Ambient Light Sensor 1C Series: Digital 16bit Serial Output Type Color Sensor 1C", pp. 1-19, Dec. 20, 2017.

VL53L5CX "Time-of-Flight 8x8 Multizone Ranging Sensor with Wide Field of View" pp. 1-38, 2021.

* cited by examiner

DIRECT PART MARKING CODE READING WITH MULTIMODAL OBJECT SENSING

TECHNICAL FIELD

The present disclosure generally relates to optical sensing and automated vision and, more particularly, to reading direct part marking (DPM) codes utilizing an optical system with an image sensor.

BACKGROUND

Direct part marking (DPM) is a process that allows users to imprint information directly on an item instead of printing the code on a label to be applied to that item. DPM may be used to mark objects, such as component parts, subassemblies, manufactured goods, or other items, with an optically-readable code. Typical uses of DPM include marking pertinent information like serial numbers, part numbers, date codes, and machine-readable symbols (e.g., barcodes, 2D codes). DPM markings may be applied to an object using indenting, embossing, engraving, laser-etching, electrochemical etching, stamping, stenciling, dot peening, inkjet printing, or other suitable technique.

DPM readers may be incorporated into handheld devices, or they may be mounted to structures or machinery. Reader devices are ideally designed to read a variety of DPM symbol types from different surfaces of objects having various shapes, materials, colors, or surface finishes. In addition, the reading should be effective and reliable under varying lighting conditions, and at varying reading distances and relative orientations between the DPM reader and the surface. Furthermore, a DPM reader should preferably capture a usable image of the DPM symbol(s) quickly, which may be critical in applications using handheld readers or where the object and DPM reader are in relative motion. These requirements present a number of practical challenges for designers of DPM readers.

For one, DPM symbols, unlike printed-label symbols, may not always appear in a contrasting color relative to the symbol's background, which is the object's surface. For instance, symbols which are etched, embossed, engraved, etc., to form raised or lowered surface features, are formed from the same material as the object's surface, and are visible due to differences in light reflection from the DPM symbol's raised or lowered features, and reflection from the background surface of the object. Depending on the lighting conditions and viewing angle of the DPM reader, the DPM symbols may be difficult to discern.

Conventional DPM readers may utilize an illumination source, such as an LED light to provide additional illumination when ambient light is insufficient. However, the use of illumination introduces additional challenges, such as specular reflections, which may drown out the DPM symbol or saturate DPM reader's image sensor. This problem may affect reading printed DPM symbols and textured symbols, alike. Further, the addition of illumination may cause a loss of contrast between the light reflected from the DPM symbol's raised or lowered features, and the symbol's background, further exacerbating the challenges with such applications.

SUMMARY

One aspect of this disclosure is directed to an optical symbol reading system, that includes an image sensor operative to capture an image of a target area; a color-sensing system that is distinct from the image sensor and separately sensitive to certain colors in the visible spectrum (the color-sensing system being operative to separately measure intensity levels of those colors); and an illumination system including a plurality of sets of photo emitters that are operative to produce various types of illumination based on illumination parameters.

The illumination system, the image sensor, and the color-sensing system are arranged such that emitted light from the illumination system, in accordance with a selected type of illumination, is directed towards the target area while a portion of the emitted light is reflected from any object of interest present in the target area and received by the image sensor and the color-sensing system.

The optical symbol reading system further includes a surface-profiling system that is distinct from the image sensor, and is arranged to measure distance to multiple points of at least one surface in the target area.

In addition, control circuitry is coupled to the image sensor, the color-sensing system, the illumination system, and the surface-profiling system. The control circuitry is operative to autonomously: activate the color-sensing system and the surface-profiling system to measure conditions comprising at least a color measurement, and a set of distance measurements; process the conditions to produce a set of assessed object characteristics representing at least color, distance from the optical symbol reading system, and orientation of the at least one surface in the target area relative to the optical symbol reading system; determine the illumination parameters based on the set of assessed object characteristics; activate the illumination system according to the illumination parameters; capture a first image of the target area during activation of the illumination system, the target area including at least a portion of the object of interest that includes, a machine-readable symbol; and process the first image to read the machine-readable symbol.

In a related aspect, an automated method for optically reading a symbol is provided. The method includes measuring certain colors of the visible spectrum present in a target area; measuring distances and reflected-light intensity of multiple points of at least one surface in the target area; based on the certain colors, on the distances, and on the reflected-light intensity, producing a set of assessed indicia representing at least color, orientation, and reflectance of the at least one surface in the target area; determining the illumination parameters based on the set of assessed indicia; providing illumination light to the target area in accordance with a selected type of illumination based on illumination parameters; capturing a first image of the target area while providing the illumination light, the target area including at least a portion of an object of interest that includes, a machine-readable symbol; and processing the first image to read the machine-readable symbol.

DETAILED DESCRIPTION

Figure 1:
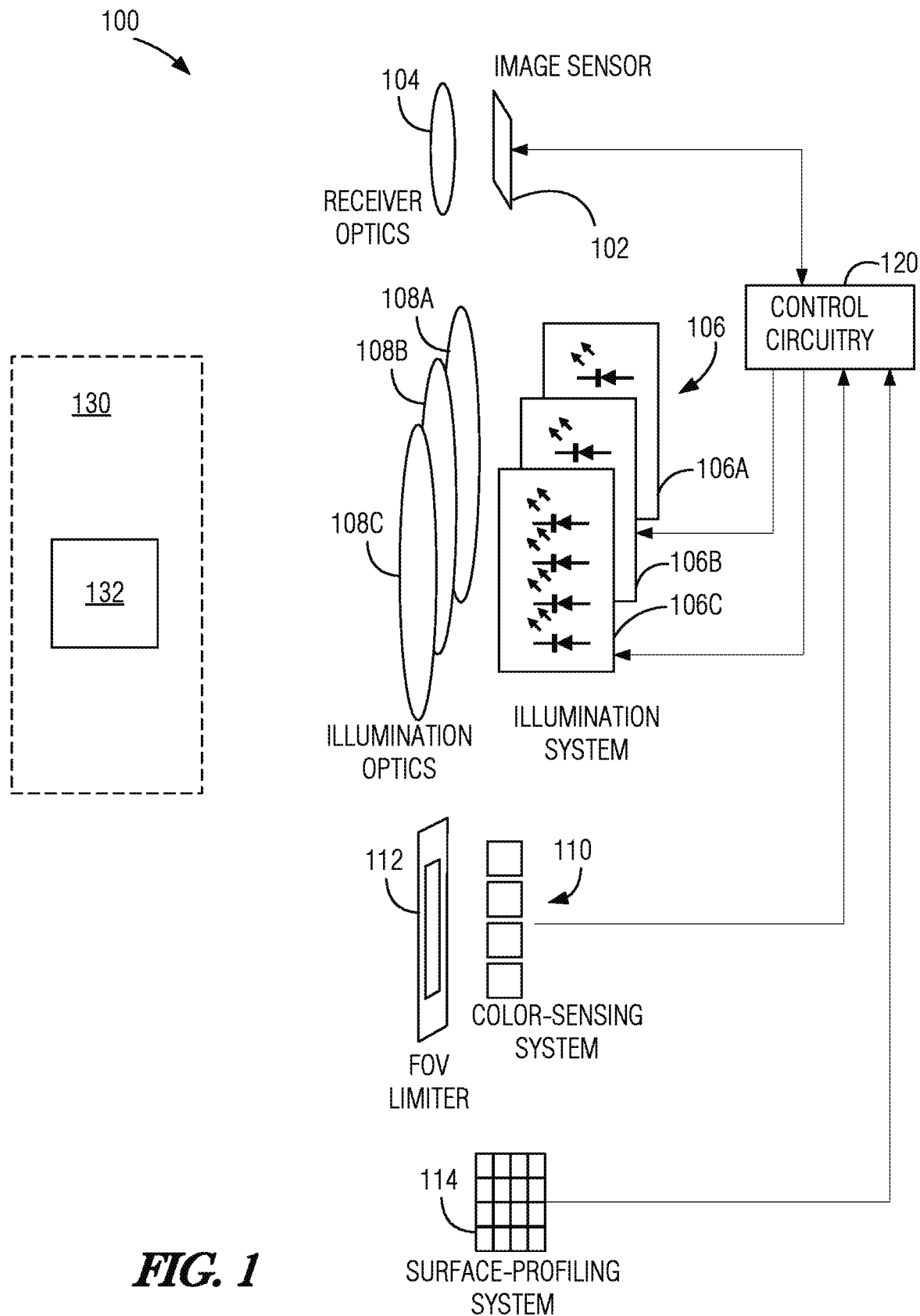
FIG. 1 is a diagram illustrating an example optical symbol reading system according to some embodiments.

The illustrations included herewith are not meant to be actual views of any particular systems, memory device, architecture, or process, but are merely idealized representations that are employed to describe embodiments herein. Elements and features common between figures may retain the same numerical designation except that, for ease of following the description, for the most part, reference numerals begin with the number of the drawing on which the elements are introduced or most fully described. In addition, the elements illustrated in the figures are schematic in nature, and many details regarding the physical layout and construction of a memory array and/or all steps necessary to access data may not be described as they would be understood by those of ordinary skill in the art.

As used herein, the singular forms "a," "an," and "the" are intended to include the plural forms as well, unless the context clearly indicates otherwise.

As used herein, "or" includes any and all combinations of one or more of the associated listed items in both, the conjunctive and disjunctive senses. Any intended descriptions of the "exclusive-or" relationship will be specifically called out.

As used herein, the term "configured" refers to a structural arrangement such as size, shape, material composition, physical construction, logical construction (e.g., programming, operational parameter setting) or other operative arrangement of at least one structure and at least one apparatus facilitating the operation thereof in a defined way (e.g., to carry out a specific function or set of functions).

As used herein, the phrases "coupled to" or "coupled with" refer to structures operatively connected with each other, such as connected through a direct connection or through an indirect connection (e.g., via another structure or component).

Aspects of the present disclosure are directed to an optical symbol reading system and the operation thereof. An optical symbol reading system in the present context means a device or set of devices that include(s) an image sensor, an illumination system, and an object surface assessment system that includes a surface-profiling system and a color-sensing system. FIG. 1 is a diagram illustrating an example optical symbol reading system 100 according to some embodiments. Optical symbol reading system 100 includes image sensor 102, illumination system 106, and an optical arrangement (including receiver optics 104 aligned with image sensor 102 and transmitter optics 108 aligned with illumination system 106). In addition, optical symbol reading system 100 includes color-sensing system 110, surface-profiling system 114, and control circuitry 120 that is interfaced with image sensor 102, illumination system 106, color-sensing system 110, and surface-profiling system 114.

Figure 2:
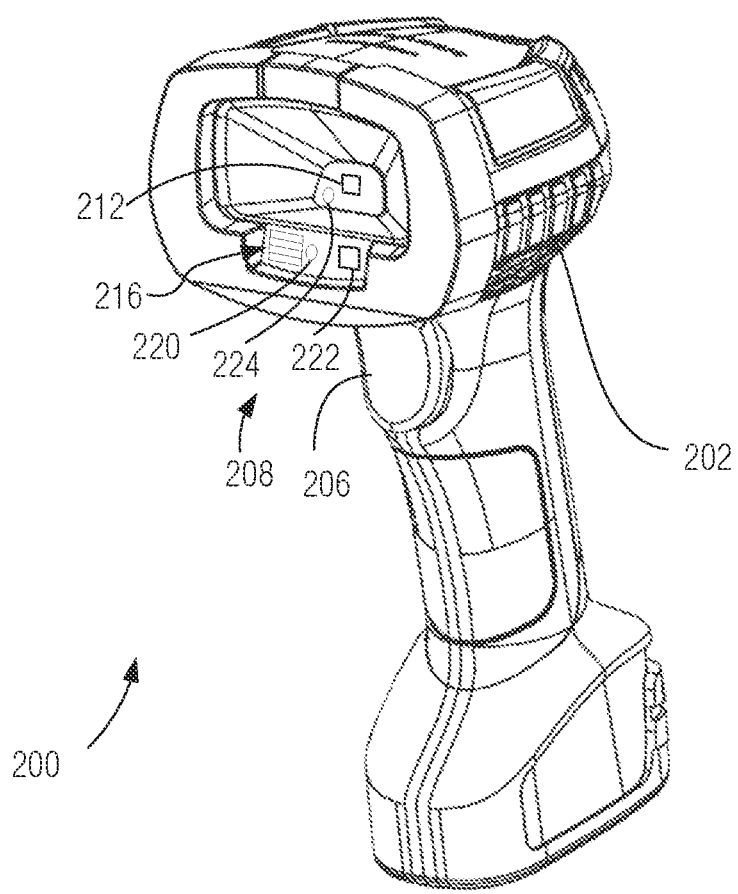
FIG. 2 is a diagram illustrating a handheld reader as one example implementation of the optical symbol reading system of FIG. 1 according to related embodiments.

FIG. 2 is a diagram illustrating handheld reader 200 as one example implementation of scanning system 100. Handheld reader 200 includes housing 202, and pushbutton control 206. As depicted, handheld reader 200 also includes front face 208, which include image sensor 212, illumination system 216, color-sensing system 220, surface-profiling system 222, and aiming system 224. Image sensor 212, illumination system 216, color-sensing system 220, and surface-profiling system 222 in this example are implementations of image sensor 102, illumination system 106, color-sensing system 110, and surface-profiling system 114. Aiming system 224 may include a set of one or more laser designators, or a laser pattern projector (e.g., in the form of a "+" a rectangle, or the like) in the visible spectrum.

As depicted, illumination system 216 may include photo emitters on front face 208. In a related embodiment (not shown), multiple groups of photo emitters include one group situated relatively closer to image sensor 102 than the other group, such that light transmitted by each of two groups of emitters, which is directly reflected from the target area, is oriented at different angles relative to image sensor 212.

According to other embodiments (not shown), a reader may be mounted to a stationary or mobile structure. Examples of mounting locations for various scanning applications include vehicles, doorways, ramps, conveyors, buildings, robots, or the like. In mounted implementations, the various transducers as located on front face 208 of the handheld-device implementation illustrated in FIG. 2 may have their own respective housings, which may be separate from the image processing system hardware.

Referring again to FIG. 1, image sensor 102 according to various embodiments may include an array of photosensing elements. Examples of photosensing elements include complementary metal-oxide semiconductor (CMOS) sensors, charge-coupled devices (CCDs), light-emitting diodes (LEDs)), photoresistors, quantum dot photoconductors or photodiodes, and the like. Image sensor 102 may be constructed using any suitable technology, whether known or arising in the future. Without limitation, some other examples include high-dynamic-range (HDR) sensors, hyperspectral sensors, polarized sensors, or the like. An array of photosensing elements may include a 2-dimensional array (e.g., a matrix of cells of photosensing elements).

Illumination system 106 according to some embodiments includes a diverse set of photo emitters that includes at least two different types of photo emitters. As depicted in the example of FIG. 1, three photo emitters, 106A, 106B, and 106C are arranged to illuminate target area 130, which may contain an object of interest 132, which may include one or more DPM or other symbols. The different types of photo emitters 106A, 106B, and 106C may be adapted to emit light in correspondingly different wavelengths or combinations of wavelengths. For example, photo emitter 106A may emit red light, whereas photo emitter 106B may emit blue light. Photo emitter 106C may combine multiple wavelengths among the red, green, and blue spectra to produce a white light. The various wavelengths of illumination may be achieved using color-specific emitters, color filters, colored reflectors, or a combination of any such techniques.

Each photo emitter 106A, 106B, 106C may be a group of similar individual devices that work in unison, or may be an individual device. The different types of photo emitters of illumination system 106 may be selectively activated by control circuitry 120 to illuminate target area 130 with one or more wavelengths of the spectrum. Thus, in the example depicted, photo emitter 106A may be separately controlled from photo emitters 106B and 106C. In a related embodiment, each photo emitter 106A, 106B, 106C may include two or more different types of individual photo emitter devices to produce a plurality of wavelengths that may be activated together.

Transmitter optics 108A-108C (generally referred to as optics 108), which may be formed from glass, thermoplastic, or other suitable transparent material, are arranged to pass or focus the emitted light, to illuminate target area 130. Transmitter optics 108 may be implemented as a window, a transparent cover, an objective lens, a microlens array, or other suitable optical arrangement. The emitted and focused illumination reflects from target area 130 and any object of interest 132. Receiver optics 104 may be formed from glass, thermoplastic, or other suitable transparent material, and arranged to pass or focus a portion of the light reflected from target area 130 or object of interest 132 onto image sensor 102. Receiver optics 104 may be implemented as a window, a transparent cover, an objective lens, a microlens array, autofocus actuator system, tunable lens, liquid lens, a combination of two or more of the foregoing, or other suitable optical arrangement. In related embodiments, receiver optics 104 implement an autofocus system.

According to various embodiments, photo emitters of illumination system 106 may be arranged to produce direct illumination, diffuse illumination, or a combination of direct and diffuse illumination. In the case of direct illumination, a photo emitter may be arranged to emit light which passes through a transparent, low-dispersion optical component 108 (e.g., window or lens). In the case of diffuse illumination, a photo emitter may be may be arranged to emit light which passes through a textured optical component 108 that disperses such light.

In one implementation, an optical component 108 is shared among two or more of the emitters 106A, 106B, 106C of illumination system 106. For instance, the optical component may be a window with a textured (diffusing) portion and a non-textured portion, with certain emitters positioned such that their emitted illumination passes through either the diffusing, or non-diffusing, portion of the window.

In one example embodiment, illumination system 106 includes one or more bright white emitter(s) arranged to provide direct illumination through a non-dispersive portion of optical component 108, one or more red emitter(s) arranged to provide diffuse illumination by passing the light through a textured portion of an optical component 108, and one or more blue emitters arranged to reflect emitted light from a blue surface internal to illumination system 106, and that reflected blue light passes through a textured portion of an optical component 108.

In related embodiments, certain photo emitters of illumination system 106 may be situated in a spaced relationship with one another. For instance, photo emitters of the same type may be positioned on opposite ends of the face of optical symbol reading system 100. One such example of spacing between photo emitters is illustrated in FIG. 2, where groups of photo emitters of illumination system 216 are spaced apart.

Color-sensing system 110 includes a set of photosensors arranged to detect various wavelengths of light (e.g., red, green, blue, and infrared), and the intensities of those wavelengths, which are reflected from target area 130. The information obtained by color-sensing system 110 is indicative of the color and shade prevalent in target area 130. As described in greater detail below, such color and shade information may be used to autonomously determine a suitable operational setting for illumination system 106. As an example of one implementation, color-sensing system 110 may include digital color sensor model no. BH1749NUC, manufactured by ROHM Semiconductor of Kyoto, Japan.

In a related embodiment, field-of-view (FoV) limiter 112 is provided in front of the set of photosensors of color-sensing system 110 to reduce its FoV. For instance, the FoV of color-sensing system 110 may be reduced by FoV limiter 112 to a small fraction (e.g., <10%) of the FoV of image sensor 102, and positioned in the center of the FoV of image sensor 102. In a related example, FoV limiter 112 limits the FoV of color-sensing system 110 to approximate the FoV of an aiming system 224. Accordingly, color-sensing system 110 avoids exposure to extraneous sources or reflections of illumination which are outside of the area of greatest interest within target area 130.

Surface-profiling system 114 includes a 3D measurement system that measures distance to points in target area 130, including distance to any object of interest 132 in the target area. In various embodiments, surface-profiling system 114 includes a multipoint 3D measurement system that is arranged to measure distance to multiple points within target area 130. In some example implementations, surface-profiling system 114 includes a multi-zone time-of-flight (ToF) sensor that comprises a ranging illuminator which is arranged to illuminate a portion of target area 130, and a receiving array of single-photon avalanche diodes (SPAD) that is sensitive to the ranging illumination, and which is arranged to detect reflected light from the illuminated portion of target area 130 and ascertain distances to a plurality of points in in the illuminated portion of target area 130 based on the relative ToFs to and from those points. An example of a suitable multi-zone ToF sensor is model no. VL53L5CX, manufactured by ST Microelectronics of Geneva, Switzerland.

Other implementations of surface-profiling system 114 according to various embodiments may include a stereoscopic camera system with an infrared texture projector and depth-measurement capability, such as the RealSense™ series of 3D cameras manufactured by Intel Corporation of Santa Clara, California. Still other measurement technologies that may be suitable for surface-profiling system 114 are contemplated. For example, scanning light-detection-and-ranging (LiDAR) technology may also provide suitable distance-to-object measurements.

In the diagram of FIG. 1, no optical components associated with color-sensing system 110 or surface-profiling system 114 are illustrated, though such optical components (e.g., lenses, filters, windows) may be provided in certain embodiments.

Control circuitry 120 coordinates the operation of the various components and subsystems of optical symbol reading system 100. Such operations include responding to activation of system 100 to initiate reading of a DPM or other symbol, using color-sensing system 110 and surface-profiling system 114 to assess the object-related conditions of object of interest 132. Also, operations controlled by control circuitry 120 include selecting an operating mode of illumination system 106 that is suited to the assessed conditions of target area 130 and the assessed conditions and orientation of the surface of object of interest 132. Control circuitry 120 is further operative to activate and read image sensor 102 and, in implementations using an autofocus system, set the focus.

Figure 3:
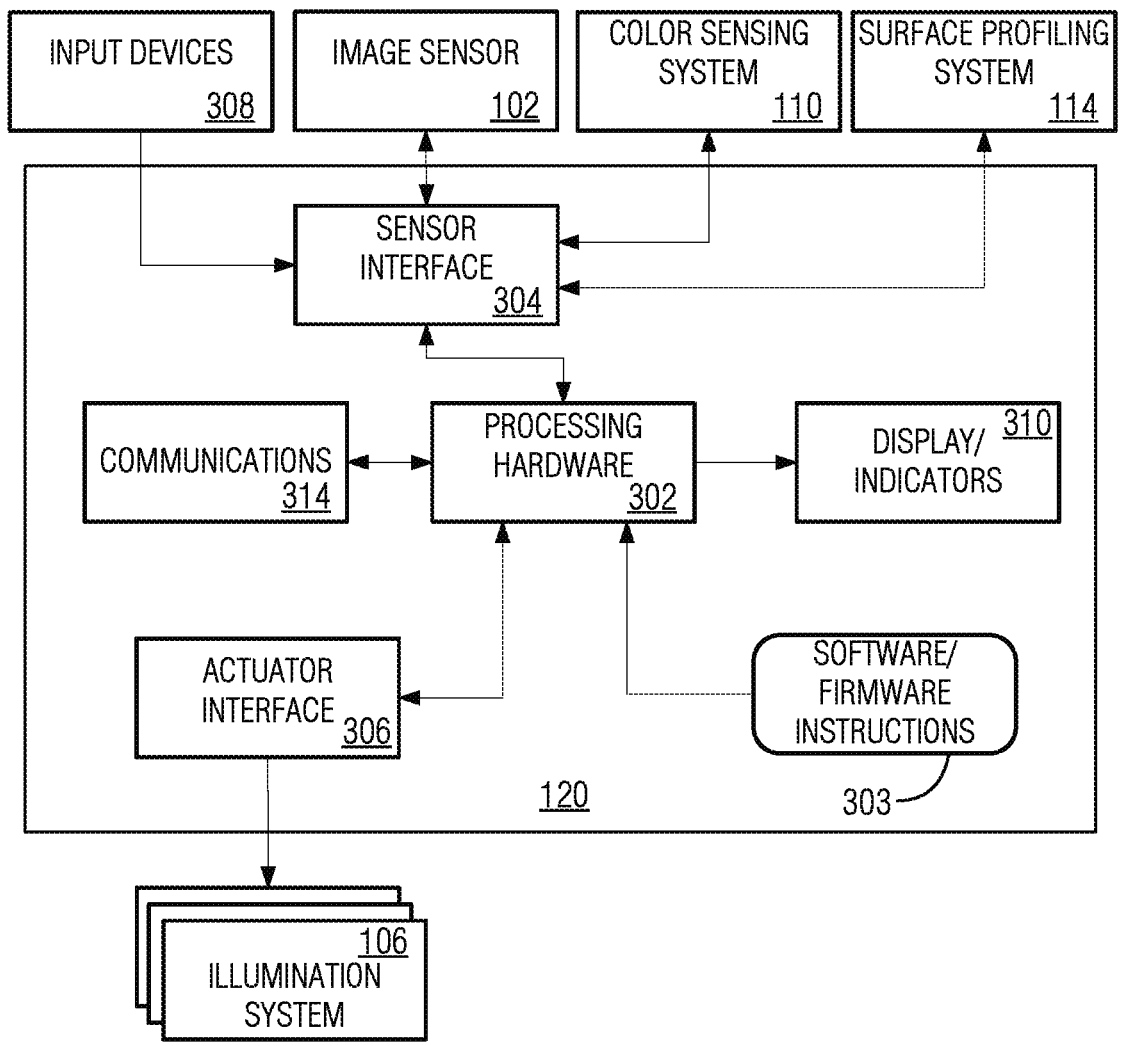
FIG. 3 is a high-level block diagram illustrating an example system architecture of the optical symbol reading system of FIG. 1 according to some embodiments.

FIG. 3 is a high-level block diagram illustrating an example system architecture of optical symbol reading system 100, with various components of control circuitry 120 shown. Control circuitry 120 includes processing hardware 302 operatively coupled to sensor interface 304, display or indicators 310, communications circuitry 314, and actuator interface 306. Processing hardware 302 includes one or more processor circuits that execute software or firmware instructions 303, with the latter being stored in a non-transitory machine-readable medium such as a read-only memory, flash memory, random-access memory, or the like.

Control circuitry 120 includes various engines, each of which is configured to carry out a function or set of functions, as detailed below. The term "engine" as used herein means a tangible device, component, or arrangement of components implemented using hardware, such as by an application specific integrated circuit (ASIC) or field-programmable gate array (FPGA), Complex Programmable Logic Device (CPLD), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

In an example, the software may reside in executable or non-executable form on a tangible machine-readable storage medium. Software residing in non-executable form may be compiled, translated, or otherwise converted to an executable form prior to, or during, runtime. In an example, the software, when executed by the underlying hardware of the engine, causes the hardware to perform the specified operations. Accordingly, an engine is specifically configured (e.g., hardwired), or temporarily configured (e.g., programmed) to operate in a specified manner or to perform part or all of any operations described herein in connection with that engine.

In examples in which engines are temporarily configured, each of the engines may be instantiated at different moments in time. For example, where the engines comprise a general-purpose hardware processor core configured using software; the general-purpose hardware processor core may be configured as respective different engines at different times. Software may accordingly configure a hardware processor core, for example, to constitute a particular engine at one instance of time and to constitute a different engine at a different instance of time.

In certain implementations, at least a portion, and in some cases, all, of an engine may be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable configurations, and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality; however, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Sensor interface 304 includes circuitry facilitating the exchange of data between processing hardware 302 various sensor devices, such as input devices 308, image sensor 102, color-sensing system 110, and surface-profiling system 114. In various examples, input devices 308 may include user-operable controls, such as pushbuttons, a trigger, keypad, or touchscreen, and the like, as well as additional sensors, an accelerometer, thermometer, humidity sensor, precipitation sensor, smoke/particulate sensor etc.

In some examples, sensor interface 304 includes data buffers, video decoders, video encoders, address and data bus interfaces, serial data receiver/transmitter circuitry, analog-to-digital (A/D) converter circuitry, and the like. In simpler embodiments, sensor interface 304 may comprise address and data busses, or a serial interface such as CAN, $I^2C$, or the like, over which the sensor devices communicate. The data communications portions of sensor interface 304 may facilitate wired or wireless communication. Sensor interface 304 is operative to pass data (e.g., switch state(s), touchscreen input, activated pixels, images, video frames, color-sensing system output, data from which to perform surface profiling) from their original format as output by image sensor 102, input devices 308, color-sensing system 110, or surface-profiling system 114, to processing hardware 302 in a suitable data format to be read by processing hardware 302.

In a related example, sensor interface 304 may additionally be configured to pass information from processing hardware 302 to image sensor 102. This upstream information may include configuration commands such as sensor gain settings, frame rate, exposure control, activation/deactivation commands, focus setting, etc.

In some embodiments, sensor interface 304 may be integrated as part of a digital signal processor (DSP) device or microcontroller device. In other embodiments, sensor interface 304 may be integrated as part of image sensor 102. In a related embodiment, sensor interface 304 may have portions distributed among image sensor 102, color-sensing system 110, or surface-profiling system 114.

Actuator interface 306 includes circuitry to control the operation of individual ones, or groups, of the photo emitters of illumination system 106. Actuator interface 306 may include current regulator circuitry, switching circuitry, or the like.

Display or indicators 310 include devices such as a liquid-crystal display (LCD), LED indicators, speaker or buzzer, and other suitable output devices.

Communications circuitry 314 includes wired or wireless communications facilities that provide input and output to and from processing hardware 302. Communication circuitry may include one or more of the following types of communication circuits: universal serial bus (USB), CAN, $I^2C$, SPI, UART, $I^3C$, Ethernet, personal-area network such as Bluetooth according to an IEEE 802.15 standard, Wi-Fi according to an IEEE 802.11 standard, or the like.

Figure 4:
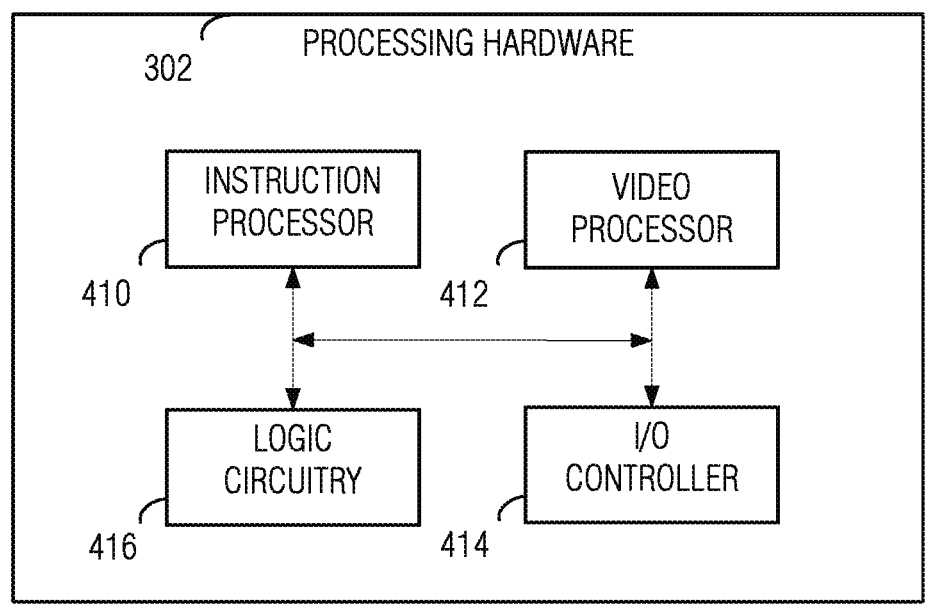
FIG. 4 is a simplified block diagram illustrating a portion of processing hardware of control circuitry of the optical symbol reading system of FIG. 1 according to an example embodiment.

FIG. 4 is a simplified block diagram illustrating a portion of processing hardware 302 of control circuitry 120 according to one example. Processing hardware 302 includes instruction processor 410, video processor 412, and input/output (I/O) controller 414. Instruction processor 410 is constructed to execute software or firmware instructions 303, the execution of which causes instruction processor 410 to implement engines to carry out the overall functionality of optical symbol reading system 100 in conjunction with the other components of control circuitry 120, image sensor 102, and illumination system 106 as shown in FIG. 3. For instance, instruction processor 410 may read input devices 308 and take actions in response to those inputs; instruction processor 410 may write output to display or indicators 310; and instruction processor 410 may exchange data with communications circuitry 314 to send and receive data to or from other devices. In addition, instructions 303, when executed by instruction processor 410, may cause instruction processor 410 to carry out condition measurements, condition evaluation based on the measurements, setting of operational parameters of illumination and image capture, image capturing, image processing, ranging determination (e.g., triangulation) and myriad other operations relating to the application of optical symbol reading system 100.

Instruction processor 410 may be of any suitable architecture. As an example, instruction processor 410 may include a central processing unit (CPU) core, RAM, non-volatile memory, memory controllers, address and data (or shared) busses, serial communications ports such a universal synchronous receiver/transmitter (UART), and peripheral circuitry such as timers, event counters, A/D or D/A converters, pulse-width modulation (PWM) generator, etc.

Video processor 412 is interfaced with instruction processor 410, and implements engines to receive captured images from image sensor 102, and to resample, crop, compress, or combine portions of images, filter, evaluate visual characteristics of the captured images, determine the location of captured visual elements within the image frame (such as the location of the aimer spot produced by an aimer transmitter (not shown)), and perform symbol reading or object detection algorithms, where applicable. In some embodiments, video processor 412 includes a digital signal processor (DSP) core having a computing architecture that is optimized for video processing and including additional or specialized arithmetic logic units (ALUs)—direct-memory access, fixed-point arithmetic, etc., ASIC, FPGA, CPLD, or combination thereof.

I/O controller 414 includes circuitry that facilitates addressing, data transfer, memory access, and other interactions between instruction processor 410, video processor 412, and the other components of control circuitry 120. As examples, I/O controller 414 may include a bus or system interconnect controller, a serial communications hub controller, or the like.

In related embodiments, instruction processor 410 and video processor 412 are integrated as a single processing device, such as a digital signal controller (DSC) that is configured to perform the respective functionality of instruction processor 410 and video processor 412 described above. Similarly, I/O controller 414 may also be integrated as part of a DSC implementation. In other related embodiments, some portion of processing hardware 302 may be implemented with logic circuitry 416, such as an application-specific integrated circuit (ASIC), FPGA, CPLD, hardware coprocessor, or the like. Logic circuitry 416 may be utilized to perform certain operations with greater speed or power efficiency than can be conventionally achieved using an instruction processor, such as image filtering, image frame combining, triangulation, or the like.

Figure 5:
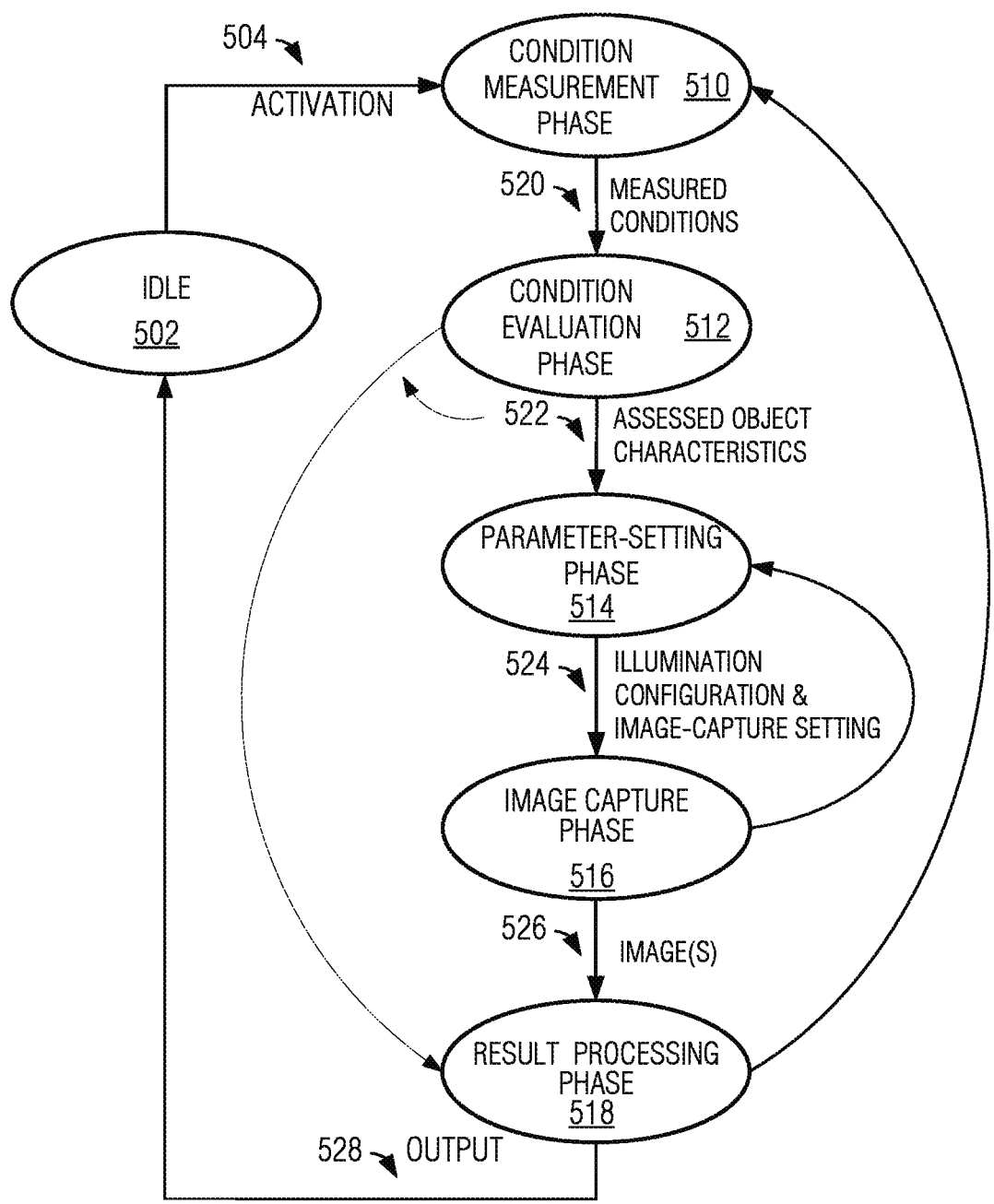
FIG. 5 is a state diagram illustrating an example operational regime of control circuitry of the optical symbol reading system of FIG. 1 according to an example embodiment.

FIG. 5 is a state diagram illustrating an operational regime of control circuitry 120 of optical symbol reading system 100 according to an example embodiment. The states include idle state 502, and operational states which include condition measurement phase 510, condition-evaluation phase 512, parameter-setting phase 514, image-capture phase 516, and result processing phase 518.

Condition-measurement phase 510 is initiated upon activation of optical symbol reading system 100 at 504, or as a new iteration following result-processing phase 518. In condition-measurement phase 510, control circuitry 120 reads color-sensing system 110, surface-profiling system 114 and, optionally, other sensors such as image sensor 102, to measure certain conditions affecting the image capture to follow for DPM or other symbol reading. may be represented as one or more data structures containing a set of measurements, including measurement(s) produced by color-sensing system 110, and measurements produced by surface-profiling system 114.

In some embodiments, color-sensing system 110 is operated in conjunction with illumination system 106. For instance, illumination system 106 may be activated to produce a white light to illuminate object of interest 132 while color-sensing system 110 is activated to measure the spectrum of reflected light from object of interest 132. The output of color-sensing system 110 may be represented as a vector of intensity levels at the various wavelengths to which color-sensing system 110 is sensitive.

In various embodiments, as part of condition measurement phase 510, surface-profiling system 114 obtains data representing distances to a plurality of points on surface(s) in target area 130 (e.g., a distances map). A distances map obtained using surface-profiling system 114 may be represented using any suitable data structure or format (e.g., depth map, point cloud, triangular or quadrilateral wireframe, shell or boundary). In related embodiments, surface-profiling system 114 obtains intensity level of each individual sensing element (e.g., pixel) of the sensor, to produce a reflected-intensity map from which reflectance of object of interest 132 may be discerned.

Condition measurement phase 510 produces measured conditions 520 as its output. Measured conditions 520 may be represented as one or more data structures built by control circuitry 120 containing the measurements provided by color-sensing system 110 and surface-profiling system 114.

Condition evaluation phase 512 is performed by control circuitry 120, and includes processing of measured conditions 520 to produce several assessments of the characteristics of object of interest 132. In some embodiments, condition evaluation phase 512 includes processing of measured conditions 520 to facilitate discrimination between object of interest 132 and background surface(s). For instance, the distances map may be processed to determine the outline of object of interest 132 and to discriminate the surface(s) of object of interest 132 from its background.

Object-background discrimination may be achieved by executing a suitable algorithm to process the distances map. As one example of such an algorithm, a boundary of an object of interest 132 may be detected by comparing distances between adjacent or neighboring points or voxels, and identifying large differences in those distances that exceed a defined threshold to detect step-change locations. The boundary of the object of interest 132 may be defined as a locus of neighboring step-change locations around a cluster of distance measurements indicating relatively closer distances than the distances outside of that cluster.

Likewise, as part of condition-evaluation phase 512, the shape and orientation of object of interest 132 may be discerned using surface-profiling system 114. For instance, the 3D profile of the portion of the object of interest 132 that is facing optical symbol reading system 100 may be ascertained following determination of the object's boundary. For example, the 3D profile can be classified as planar, faceted, curved, or mixed. In such embodiments, the 3D profile, and its orientation, are indicative of the way in which the illumination would be reflected by the object of interest 132 towards image sensor 102.

In related embodiments, the profile and orientation of the of object of interest 132 are determined from the distances map. Accordingly, when the object of interest 132 is planar or faceted, the angle(s) of the plane(s) relative to optical symbol reading system 100 may be discerned based on the distances map. In related embodiments, when the object of interest 132 has curved surface(s) facing optical symbol reading system 100, a classification of the profile of the curvature (e.g., spherical, cylindrical, conical, parabolic, toroidal) may be discerned from the distances map.

Figure 6A:
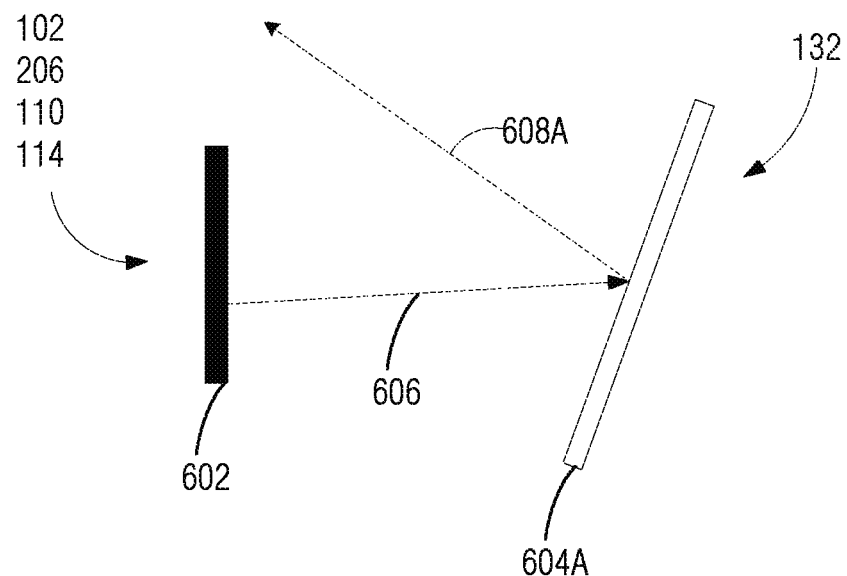
FIGS. 6A and 6B are simplified diagrams illustrating examples of different orientations between a front face of the optical symbol reader, and a surface of an object of interest.
Figure 6B:
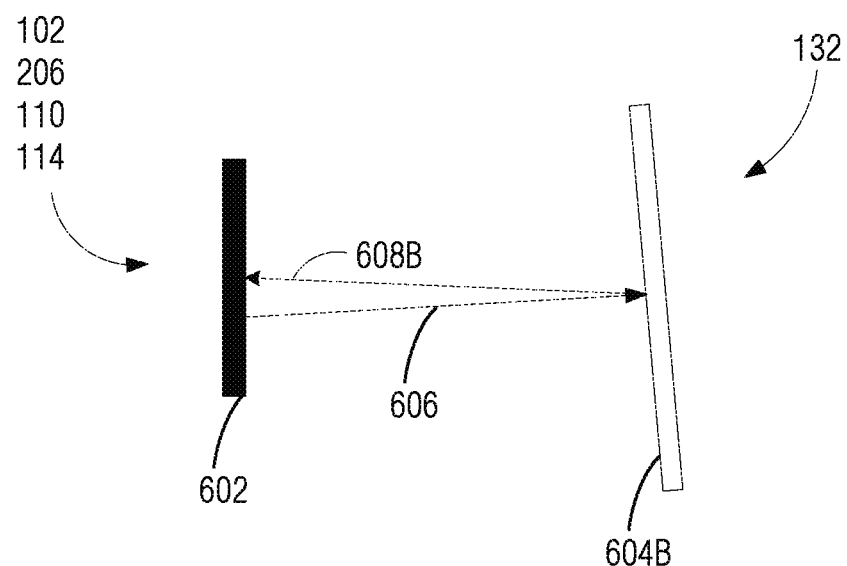

FIGS. 6A and 6B are simplified diagrams illustrating examples of different orientations between optical symbol reader front face 602 (shown as a generalized depiction of front face 208 (FIG. 2)), and surface 604 of object of interest 132. Optical symbol reader front face 602 includes the operative surfaces of image sensor 102, illumination system 106, color-sensing system 114, and surface-profiling system 114. As shown in FIG. 6A, surface 604A is oriented such that illumination beam 606 that is emitted by illumination system 106 reflects from surface 604A to produce reflected beam 608A, which is not directly incident on front face 602. Any specular component of reflected beam 608A is thus directed away from reader front face 602. In FIG. 6B, surface 604B is oriented such that illumination beam 606 reflects to produce reflected beam 608B which is directly incident on reader front face 602.

As described in greater detail below, these different orientations of surface 604, in combination with call for different illumination settings. For instance, illumination may be selectively applied as: bright light, dim light, light of a particular color or set of one or more wavelengths, direct or diffuse light, light emitted from selected one or more emitter(s) positioned at different locations or distances relative to the image sensor, or any combination of these adjustable parameters.

In additional related embodiments, surface-profiling system 114 facilitates measurement of reflectance characteristics of object of interest 132. In one such embodiment, surface-profiling system 114 measures the intensity of reflected illumination from different points on the surface of object of interest 132 which receive the incident illumination at different angles of incidence. These measurements may be processed to compare the intensity values of reflected illumination that is received from points on the surface of object 132 that closer to the optical axis of surface-profiling system 114, and from points on the surface of object 132 which are offset from the optical axis.

Figure 7:
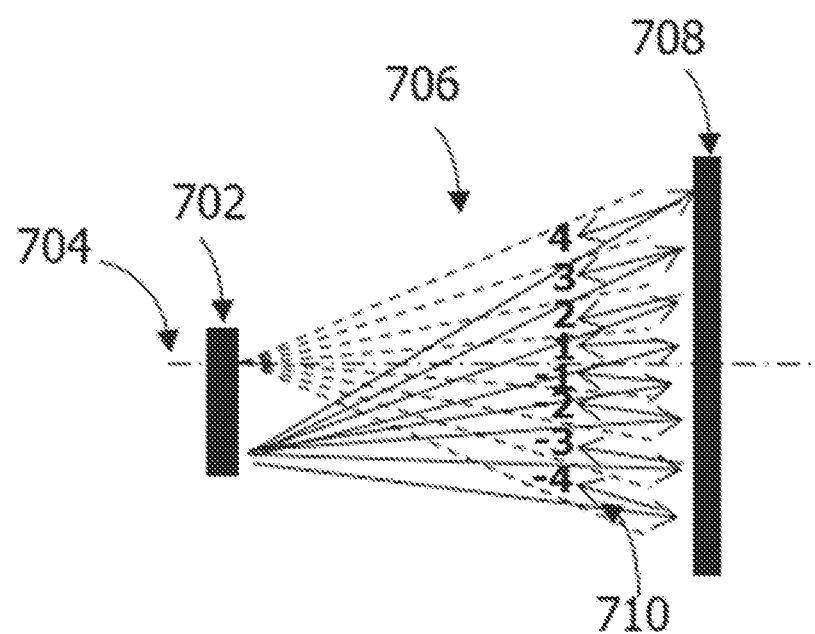
FIG. 7 is a simplified diagram illustrating a measurement configuration for assessing reflectance characteristics according to an example.

FIG. 7 is a simplified diagram illustrating a measurement configuration for assessing reflectance characteristics according to an example. Surface-profiling system 114 includes ToF sensor 702, which emits ToF illumination 706 at a particular wavelength or wavelengths. The photons of ToF illumination 706 reach, and reflect from, object surface 708. The reflected beams are indicated at 710. In this diagram, the reflected beams 710 are labeled with numerals $\{-4, -3, -2, -1, 1, 2, 3, 4\}$. As illustrated, certain reflected beams that are closer to optical axis 704 (e.g., $\{-1, 1\}$), and certain reflected beams 710 that are more offset from the optical axis 704 (e.g., $\{-4, 4\}$), arrive at different angles of incidence on object surface 708.

Similarities or differences in the intensity from received reflected beams 710 among received reflected beams that are closer (i.e., impinging on sensors of ToF sensor 702 which are centrally situated), and those which are more offset, with respect to optical axis 704 (i.e., impinging on sensors of ToF sensor 702 which are peripherally situated), may be correlated to corresponding reflectance characteristics of the surface of the object 708. For example, if similar intensities are measured at the various distances from the optical axis 704, this is indicative that the characteristic of the reflectance is diffuse. If the intensities of measured reflected illumination vary substantially and sharply based on distance from the optical axis 704, this is indicative that the reflectance is primarily specular. If the intensities of measured reflected illumination vary gradually based on distance from the optical axis 704, this is indicative that the reflectance is primarily spread.

Figure 8A:
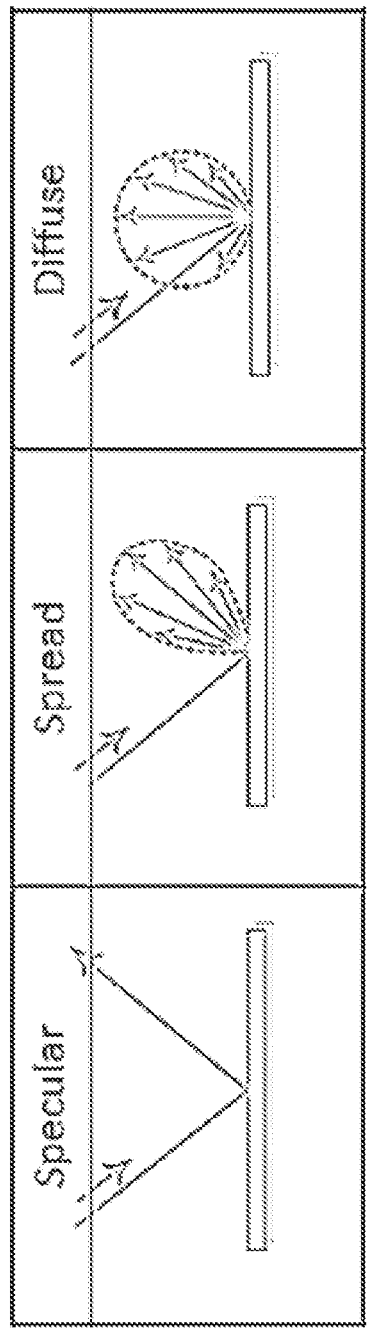
FIGS. 8A and 8B are diagrams illustrating various types of reflectance characteristics, which are generally a function of surface finish of an object of interest.
Figure 8B:
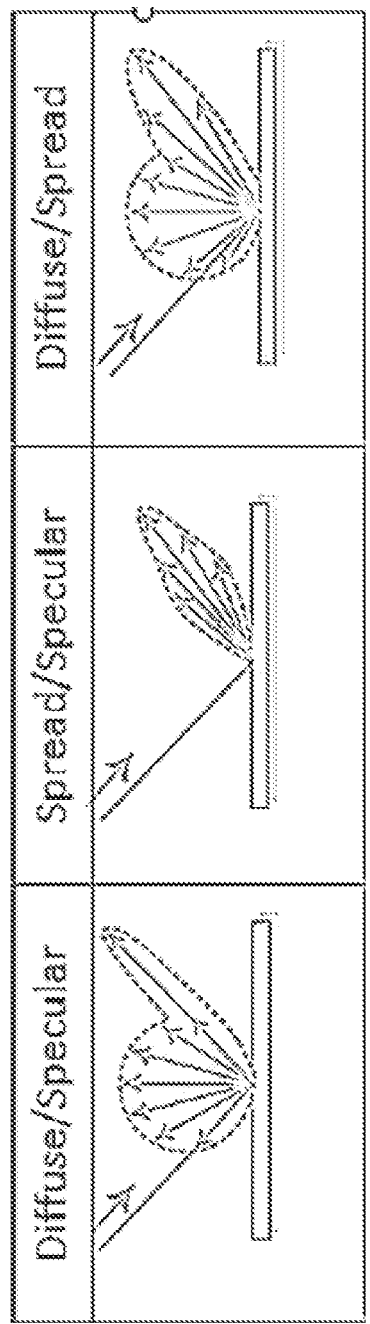

FIGS. 8A and 8B are diagrams illustrating various types of reflectance characteristics, which are generally a function of surface finish of object of interest 132. FIG. 8A illustrates specular, spread, and diffuse reflectance types. FIG. 8B illustrates hybrid reflectance types, including diffuse/specular, spread/specular, and diffuse/spread. According to some embodiments, these various types of reflectance characteristics may be assessed utilizing surface-profiling system 114 during condition measurement phase 510, in which the measured conditions 512 are gathered, and condition evaluation phase 512 in which those measurements are processed to obtain a classification of reflectance characteristics of object of interest 132.

In related embodiments, the 3D profile and orientation of the facing surface of object of interest 132 are taken into account when computing the reflectance characteristics. For example, a correction function may be applied to each portion of the surface of object of interest 132 that is offset from the normal of surface-profiling system 114. Likewise, the geometry of concave or convex surfaces may be taken into account when computing the reflectance characteristics.

Condition-evaluation phase 512 produces assessed object characteristics 522 as its output. Assessed object characteristics 522 may include the color of the surface of object of interest 132, the distance to object of interest 132, the 3D profile of the surface(s) of the object of interest 132, the orientation of the surface(s) of object of interest 132, the reflectance characteristics of that surface(s) of the object of interest 132, and the outline of object of interest 132 against its background. This information may be represented as one or more suitable data structures, such as a list, table, database record, or the like.

Figure 9:
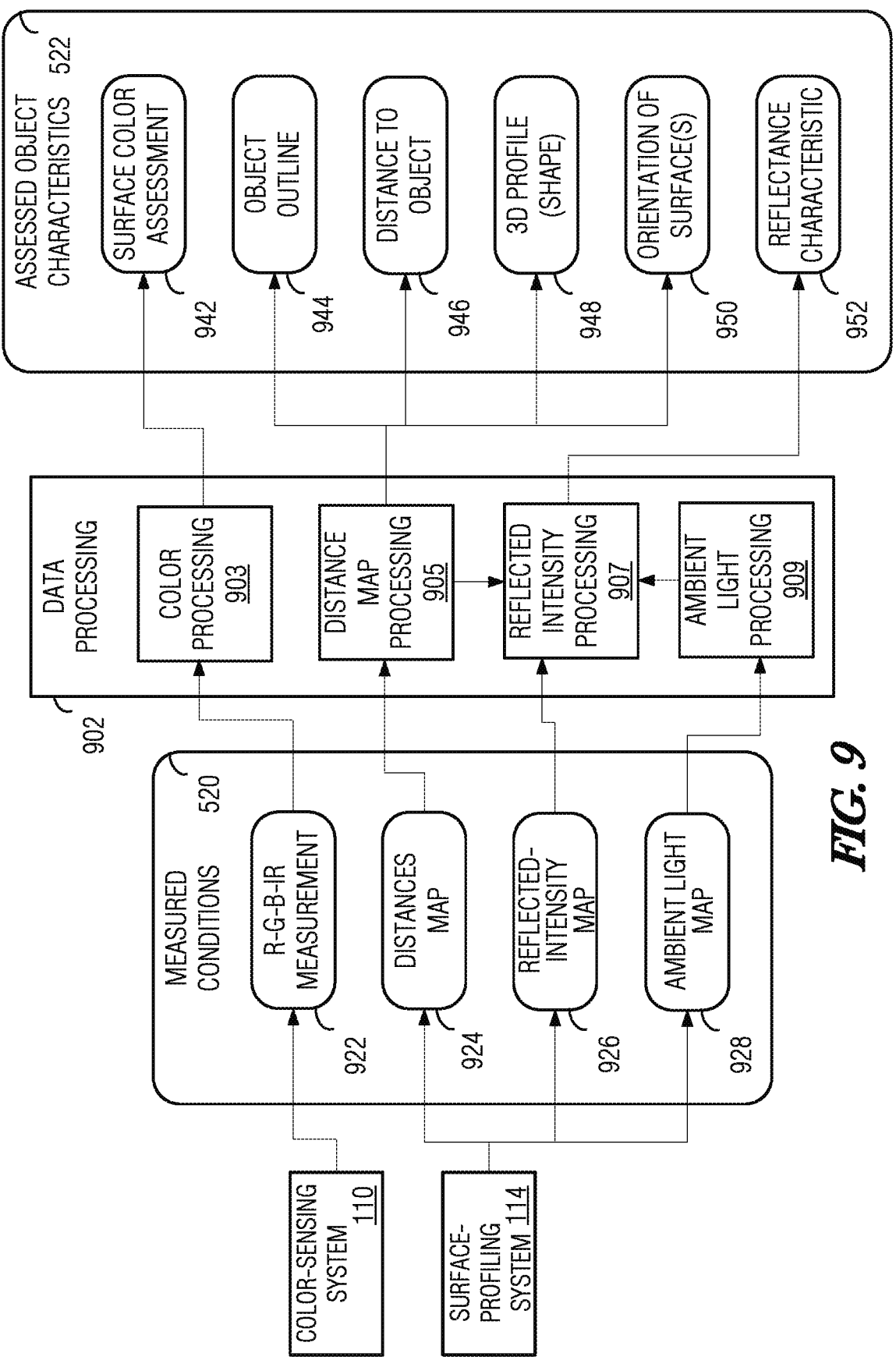
FIG. 9 is a data flow diagram illustrating an overview of the generation of measured conditions, assessed object characteristics, and their relationship, according to an example implementation.

FIG. 9 is a data flow diagram illustrating an overview of the generation of measured conditions 520, assessed object characteristics 522, and their relationship, according to an example implementation. These data items originate from color-sensing system 110 and surface profiling system 114. Color-sensing system 110 produces R-G-B-IR measurement 922 as its output. Surface-profiling system 114 produces distances map 924, reflected-intensity map 926, and ambient light map 928. Data processing engine 902 implemented by control circuitry 120 operate on R-G-B-IR measurement 922, distances map 924, reflected-intensity map 926, and ambient light processing 909 to produce assessed object characteristics 522.

Data processing engine 902 performs color processing operation 903, distance map processing operation 905, and reflected intensity processing operation 907. Color processing operation 903 reads R-G-B-IR measurement 922, and processes this raw data to determine a predominant color as observed by color-sensing system 110. The predominant color determination may be a classification of the observed color into one of a predefined set of color categories (e.g., black, white, gray, red, lime, blue, yellow, cyan, magenta, maroon, olive, green, purple, teal, or navy).

Distance map processing operation 905 reads distances map 924 produced by surface-profiling system 114, and produces object outline 944 (e.g., which may be represented as a set of coordinates, or vectors, defining the boundary of object of interest 132), a measure of distance 946 to the object of interest 132 (which may be a scalar value representing the distance to the center of object of interest 132), the 3D profile, or shape, 948 of the facing surface of object of interest 132 (which may be a classification into a category of surface shapes, such as planar, prismatic, spherical, parabolic, cylindrical, convex, concave, or the like), and orientation 950 of the facing surface(s) of object of interest 132 (e.g., which may be represented as the angular offset of the normal vector of the surface of object of interest 132 from the optical axis of surface-profiling system 114 or image sensor 102, along the x-z plane and the y-z plane where the z-axis is parallel to the optical axis, and the x-y plane is perpendicular to the optical axis).

Reflected intensity processing operation 907 reads reflected-intensity map 926, and receives a processing result of ambient light processing 909. Based on this information, reflected intensity processing operation 907 produces reflectance characteristic 952. Computation of reflectance characteristic 952 may be further based on at least some of the output of distance map processing operation 905 (for example, the distance to object 946, 3D profile 948, or orientation of surface(s) 950, which (individually or in combination) may be used to correct the reflectance determination to account for the surface(s) of object of interest 132 being offset from the normal orientation to the optical axis).

Referring again to FIG. 5, assessed object characteristics 522 are used in parameter-setting phase 514 to set various operational parameters of illumination and image capture for DPM symbol reading.

Figure 10:
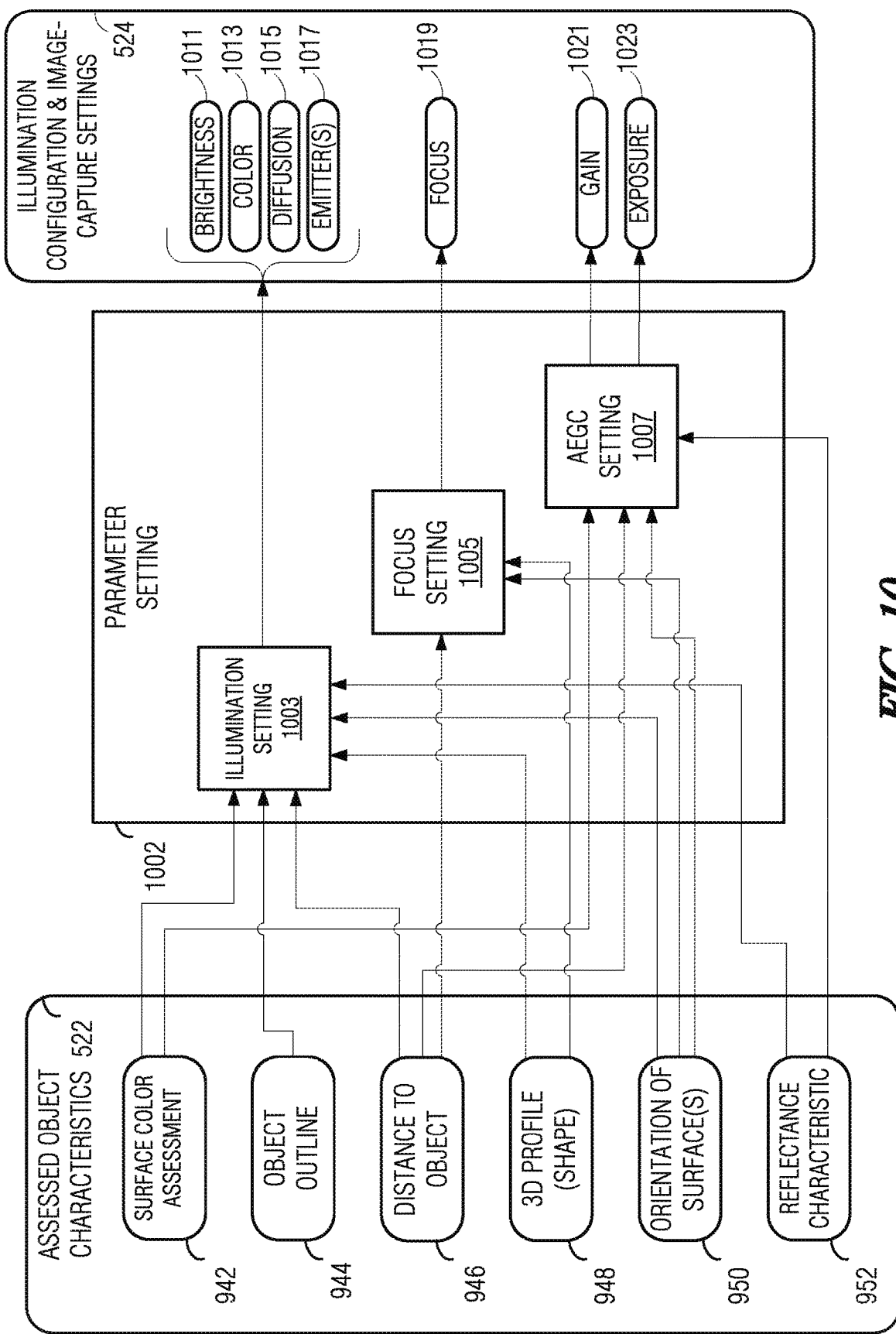
FIG. 10 is a data-flow diagram illustrating an example implementation of a parameter-setting phase of the state diagram of FIG. 5.

FIG. 10 is a data-flow diagram illustrating an example implementation of parameter-setting phase 514, which may be carried out via processing circuitry 120. As illustrated, parameter-setting engine 1002 executes illumination-setting operation 1003, focus-setting operation 1005, and automatic exposure and gain control (AEGC)-setting operation 1007. The result of these operations is illumination configuration and image capture settings data set 524.

Assessed object characteristics 522 are used in various combinations to produce each parameter setting operation 1003, 1005, 1007 as shown in this example. For instance, illumination setting operation 1003 is based on surface color assessment 942, object outline 944, distance 946 to object of interest 132, 3D profile 948, orientation of the facing surface(s) 950, and reflectance characteristic 952. Illumination setting operation 1003 may set various parameters of illumination system 106. These include brightness setting 1011, which sets a variable light output to a determined value, color setting 1013, which selects a variable color (e.g., red, blue, white, or other), diffusion setting 1015, which selects whether the illumination is direct or diffuse (e.g., based on a selection of emitter behind a diffusion filter, or behind a transparent window), and emitter location selection 1017, which selects certain emitters of the appropriate type from among similar emitters in various locations, such that the angle of incidence of the illumination may be selected.

Focus setting operation 1005 provides a control signal for setting the focus 1019 of receiver optics 104 in those embodiments where such focus is adjustable. Focus setting operation 1005 may be based on the distance to object 946, 3D profile 948, and orientation 950 of the object's surface(s) according to the example depicted. In a related example, when the object's facing surface is generally normal to the optical axis, a single focus 1019 may be determined corresponding to the plane of that surface; but in situations where the object's surface is skewed relative to the optical axis, or where the object's surface is curved along the depth dimension such that different portions of the surface are at different distances, focus setting operation 1005 may produce a plurality of focus settings 2019 corresponding to various depths to facilitate rapid capture of a series of images at those different focal settings.

AEGC-setting operation 1007 determines a suitable gain setting 1021, and exposure setting 1023, for image sensor 102 based on various object characteristics, such as surface color assessment 942, distance to object 946, orientation of surface(s) 950, and reflectance characteristic 952.

In related embodiments, different combinations of assessed object characteristics may be taken into account according to corresponding parameter-setting criteria, for illumination setting operation 1003, focus setting operation 1005, or AEGC-setting operation 1007, than the combinations exemplified in FIG. 10.

To illustrate one example of parameter-setting criteria for illumination setting operation 1003, Table 1 below provides various modes of illumination corresponding to assessed reflectance characteristic 952, and on 3D profile 948 and surface orientation 950, the combination of which affects the directionality and direction of reflected illumination from the surface(s) of object of interest 132:

TABLE 1

| Reflection Direction | Reflectance Characteristic | | | | | |
|---|---|---|---|---|---|---|
| | Specular | Spread | Diffuse | Diffuse/ Specular | Spread/ Specular | Diffuse/ Spread |
| Indirect | Bright | Diffuse-Bright | Bright | Bright | Diffuse-Bright | Bright |
| Direct | Diffuse-Moderate | Diffuse-Bright | Bright | Diffuse-Moderate | Diffuse-Bright | Diffuse-Moderate |
| Partially Direct | Diffuse-Bright | Diffuse-Bright | Bright | Diffuse-Bright | Diffuse-Bright | Diffuse-Bright |

In Table 1, the Reflectance Characteristic corresponds to assessed reflectance characteristic 952, as illustrated in FIGS. 8A-8B. The Reflection Direction corresponds to the orientation and 3D profile of the facing surface of object of interest 132 based on 3D profile 948 and surface orientation 950. Accordingly, the Direct reflection direction corresponds to a surface shape and orientation that directs a large portion of the reflected illumination towards optical symbol reader front face 602, as depicted, for instance, in FIG. 6B. The Indirect reflection direction corresponds to a surface shape and orientation that directs a large portion of the reflected illumination away from optical symbol reader front face 602, as depicted, for instance, in FIG. 6A. The Partially Direct reflection direction corresponds to a surface shape and orientation that directs a partial portion of the reflected illumination towards optical symbol reader front face 602. For each combination of Reflection Characteristic and Reflection Direction, an illumination parameter is indicated.

In Table 1, the Bright illumination parameter indicates a direct (non-diffuse) illumination that produces a bright-intensity, specular reflection. A bright-intensity reflection in the present context is a reflection that results from illumination with a white, high-intensity light, or with a high-intensity light that has a color which is similar to the color of the surface of object of interest 132. The Diffuse-Bright illumination parameter indicates a diffuse illumination that produces a bright, non-specular reflection. The Diffuse-Moderate illumination parameter indicates a diffuse illumination that produces a moderate-intensity, non-specular reflection. A moderate-intensity reflection is a reflection that results from illumination with a reduced-intensity white light, or a light of a different color than the color of the surface of object of interest 132.

Turning again to FIG. 5, image capture phase 516 includes operation of image sensor 102 and illumination system 106 according to illumination configuration and image capture settings 524, to capture an image of object of interest 132. Accordingly, illumination is provided based on brightness 1011, color 1013, diffusion 1015, and emitter selections 1017. Furthermore, receiver optics 104 may be dynamically focused based on focus setting 1005, and AEGC setting 1007 of image sensor 102 may be set to facilitate image capture containing a DPM or other symbol to be read.

In image capture phase 516, image sensor 102 is used to capture an image containing a DPM or other symbol while the selected illumination mode is activated. In some embodiments, image-capture phase 516 may be performed iteratively with parameter setting phase 514, such that captured image(s) 526 may be analyzed for clarity, contrast, line quality, or other measure relating to symbol readability, to further adjust illumination configuration and image capture settings data set 524 if necessary.

In result processing phase 518, captured image(s) 526 are processed to read any DPM or other machine-readable symbol or characters to produce output 528 (e.g., representing the interpretation of the DPM or other symbol). Result processing phase 518 may be performed based on one or more decoding libraries containing one or more algorithms or criteria for performing image processing of captured images 526 to identify or evaluate the DPM or other symbol on object of interest 132.

In some related embodiments, assessed object characteristics 522 may be further utilized as criteria for selecting certain algorithms or parameters of the one or more decoding libraries. For instance, certain color and reflectance combinations, as represented in assessed object characteristics 522 may be correlated with certain decoding library algorithms or parameters, the selection of which can speed up, or improve the accuracy, of decoding of the DPM or other symbol in result processing phase 518.

The resulting output 528, may be communicated to a receiving device via communications circuitry 314, or presented to a user via display or indicators 310, for example. The state sequence may iterate to condition measurement phase 510.

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the following appended claims and their legal equivalents.

ADDITIONAL NOTES AND EXAMPLES

Example 1 is an optical symbol reading system, comprising: an image sensor operative to capture an image of a target area; a color-sensing system that is distinct from the image sensor and separately sensitive to certain colors in the visible spectrum, the color-sensing system being operative to separately measure intensity levels of those colors; an illumination system including a plurality of sets of photo emitters that are operative to produce various types of illumination based on illumination parameters, wherein the illumination system, the image sensor, and the color-sensing system are arranged such that emitted light from the illumination system, in accordance with a selected type of illumination, is directed towards the target area while a portion of the emitted light is reflected from any object of interest present in the target area and received by the image sensor and the color-sensing system; a surface-profiling system that is distinct from the image sensor, and arranged to measure distance to multiple points of at least one surface in the target area; and control circuitry coupled to the image sensor, the color-sensing system, the illumination system, and the surface-profiling system, wherein the control circuitry is operative to autonomously: activate the color-sensing system and the surface-profiling system to measure conditions comprising at least a color measurement, and a set of distance measurements; process the conditions to produce a set of assessed object characteristics representing at least color, distance from the optical symbol reading system, and orientation of the at least one surface in the target area relative to the optical symbol reading system; determine the illumination parameters based on the set of assessed object characteristics; activate the illumination system according to the illumination parameters; capture a first image of the target area during activation of the illumination system, the target area including at least a portion of the object of interest that includes, a machine-readable symbol; and process the first image to read the machine-readable symbol.

In Example 2, the subject matter of Example 1 includes, wherein the machine-readable symbol is a direct part marking (DPM) symbol.

In Example 3, the subject matter of Examples 1-2 includes, wherein the illumination system comprises emitters situated at different locations relative to the image sensor, and wherein the various types of illumination include various illumination sources according to selective activation of different ones of the emitters situated at the different locations.

In Example 4, the subject matter of Example 3 includes, wherein the control circuitry is further operative to autonomously determine the illumination parameters to set an illumination source from among the various types of illumination sources, and an automatic exposure and gain control (AEGC) setting of the image sensor, based on at least the orientation of the at least one surface in the target area relative to the optical symbol reading system.

In Example 5, the subject matter of Examples 1-4 includes, wherein the various types of illumination include various colors and various levels of brightness based on the illumination parameters.

In Example 6, the subject matter of Example 5 includes, wherein the illumination system comprises emitters operative to selectively produce red, blue, and white illumination based on the illumination parameters.

In Example 7, the subject matter of Examples 5-6 includes, wherein the control circuitry is further operative to autonomously determine the illumination parameters to set an illumination color based on at least the color of the at least one surface in the target area.

In Example 8, the subject matter of Examples 1-7 includes, wherein the various types of illumination include various types of diffusion based on the illumination parameters.

In Example 9, the subject matter of Example 8 includes, wherein the illumination system comprises different sets of emitters situated behind different types of transparent optical components, including a clear optical component through which direct illumination is transmitted, and a dispersive optical component through which diffuse illumination is transmitted.

In Example 10, the subject matter of Examples 8-9 includes, wherein the control circuitry is further operative to autonomously determine the illumination parameters to set a diffusion type based on at least the orientation of the at least one surface in the target area relative to the optical symbol reading system.

In Example 11, the subject matter of Example 10 includes, wherein the set of assessed object characteristics further includes a 3D shape of at the least one surface in the target area, and wherein the control circuitry is further operative to autonomously determine the illumination parameters to set a diffusion type based further on the 3D shape.

In Example 12, the subject matter of Examples 1-11 includes, wherein the image sensor is situated behind receiver optics that include a focusing lens, and wherein the control circuitry is further operative to autonomously determine a focus setting for the focusing lens based on at least a portion of the set of assessed object characteristics including at least the distance from the optical symbol reading system.

In Example 13, the subject matter of Examples 1-12 includes, wherein: the surface-profiling system is further arranged to measure reflected intensity of illumination reflected from multiple points of the at least one surface in the target area; the conditions further comprise the reflected intensity; and the set of assessed object characteristics further represents reflectance of the at least one surface in the target area.

In Example 14, the subject matter of Example 13 includes, wherein: the various types of illumination include various types of diffusion based on the illumination parameters; and the control circuitry is further operative to autonomously determine the illumination parameters to set a diffusion type based on at least the reflectance of the at least one surface in the target area.

In Example 15, the subject matter of Examples 13-14 includes, wherein the assessed object characteristics that represent reflectance of the at least one surface in the target area are represented as a reflectance map, wherein the reflectance map includes intensity of reflected illumination from different points on the at least one surface in the target area which receive illumination at different angles of incidence.

In Example 16, the subject matter of Examples 1-15 includes, wherein the color-sensing system comprises a set of photosensors arranged to detect various wavelengths of light and the intensities of those wavelengths, wherein the color-sensing system has a color-sensing field-of-view that is limited to a fraction of a field of view of the image sensor.

In Example 17, the subject matter of Examples 1-16 includes, wherein the surface-profiling system comprises a multi-zone time-of-flight (ToF) sensor that includes a ranging illuminator and a receiving array of photosensors that is sensitive to the ranging illumination.

Example 18 is an automated method for optically reading a symbol, the method comprising: measuring certain colors of the visible spectrum present in a target area; measuring distances and reflected-light intensity of multiple points of at least one surface in the target area; based on the certain colors, on the distances, and on the reflected-light intensity, producing a set of assessed indicia representing at least color, orientation, and reflectance of the at least one surface in the target area; determining the illumination parameters based on the set of assessed indicia; providing illumination light to the target area in accordance with a selected type of illumination based on illumination parameters; capturing a first image of the target area while providing the illumination light, the target area including at least a portion of an object of interest that includes, a machine-readable symbol; and processing the first image to read the machine-readable symbol.

In Example 19, the subject matter of Example 18 includes, wherein providing illumination light to the target area includes providing a selected illumination type from among various types of illumination that include various colors, various levels of brightness, and various types of diffusion of the illumination light, based on the illumination parameters.

In Example 20, the subject matter of Examples 18-19 includes, wherein measuring distances of multiple points of at least one surface in the target area includes measuring a time of flight (ToF) of ranging illumination to the at least one surface.

Example 21 is at least one machine-readable medium including instructions that, when executed by processing circuitry, cause the processing circuitry to perform operations to implement of any of Examples 18-20.

Example 22 is an apparatus comprising means to implement of any of Examples 1-20.

Example 23 is a system to implement of any of Examples 18-20.

Example 24 is a method to implement of any of Examples 1-17.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of 35 U.S.C. § 114(f), are not to be invoked unless the specific terms "means for" or "step for" are recited in a claim.

What is claimed is:

1. An optical symbol reading system, comprising:
an image sensor operative to capture an image of a target area;
a color-sensing system that is distinct from the image sensor and separately sensitive to certain colors in the visible spectrum, the color-sensing system being operative to separately measure intensity levels of those colors;
an illumination system including a plurality of sets of photo emitters that are operative to produce various types of illumination based on illumination parameters, wherein the illumination system, the image sensor, and the color-sensing system are arranged such that emitted light from the illumination system, in accordance with a selected type of illumination, is directed towards the target area while a portion of the emitted light is reflected from any object of interest present in the target area and received by the image sensor and the color-sensing system;
a surface-profiling system that is distinct from the image sensor, and arranged to measure distance to multiple points of at least one surface in the target area; and
control circuitry coupled to the image sensor, the color-sensing system, the illumination system, and the surface-profiling system, wherein the control circuitry is operative to autonomously:
activate the color-sensing system and the surface-profiling system to measure conditions comprising at least a color measurement, and a set of distance measurements;
process the conditions to produce a set of assessed object characteristics representing at least color, distance from the optical symbol reading system, and orientation of the at least one surface in the target area relative to the optical symbol reading system;
determine the illumination parameters based on the set of assessed object characteristics;
activate the illumination system according to the illumination parameters;
capture a first image of the target area during activation of the illumination system, the target area including at least a portion of the object of interest that includes a machine-readable symbol; and
process the first image to read the machine-readable symbol,
wherein:
the surface-profiling system is further arranged to measure reflected intensity of illumination reflected from multiple points of the at least one surface in the target area and compare reflected-light intensity values of reflected illumination to determine a reflectance of the at least one surface in the target area including applying a correction function to each portion of the at least one surface that is offset from a normal axis of the surface-profiling system and for a concave or convex shape of the at least one surface;
the conditions further comprise the reflected intensity; and
the set of assessed object characteristics further represents reflectance of the at least one surface in the target area.

2. The optical symbol reading system of claim 1, wherein the machine-readable symbol is a direct part marking (DPM) symbol.

3. The optical symbol reading system of claim 1, wherein the illumination system comprises emitters situated at different locations relative to the image sensor, and wherein the various types of illumination include various illumination sources according to selective activation of different ones of the emitters situated at the different locations.

4. The optical symbol reading system of claim 3, wherein the control circuitry is further operative to autonomously determine the illumination parameters to set an illumination source from among the various types of illumination sources, and an automatic exposure and gain control (AEGC) setting of the image sensor, based on at least the orientation of the at least one surface in the target area relative to the optical symbol reading system.

5. The optical symbol reading system of claim 1, wherein the various types of illumination include various colors and various levels of brightness based on the illumination parameters.

6. The optical symbol reading system of claim 5, wherein the illumination system comprises emitters operative to selectively produce red, blue, and white illumination based on the illumination parameters.

7. The optical symbol reading system of claim 5, wherein the control circuitry is further operative to autonomously determine the illumination parameters to set an illumination color based on at least the color of the at least one surface in the target area.

8. The optical symbol reading system of claim 1, wherein the various types of illumination include emitting either direct or diffuse illumination based on the illumination parameters.

9. The optical symbol reading system of claim 8, wherein the illumination system comprises different sets of emitters situated behind different types of transparent optical components, including a clear optical component through which direct illumination is transmitted, and a dispersive optical component through which diffuse illumination is transmitted.

10. The optical symbol reading system of claim 8, wherein the control circuitry is further operative to autonomously determine the illumination parameters to set a diffusion type based on at least the orientation of the at least one surface in the target area relative to the optical symbol reading system.

11. The optical symbol reading system of claim 10, wherein the set of assessed object characteristics further includes a 3D shape of at the least one surface in the target area, and wherein the control circuitry is further operative to autonomously determine the illumination parameters to set a diffusion type based further on the 3D shape.

12. The optical symbol reading system of claim 1, wherein the image sensor is situated behind receiver optics that include a focusing lens, and wherein the control circuitry is further operative to autonomously determine a focus setting for the focusing lens based on at least a portion of the set of assessed object characteristics including at least the distance from the optical symbol reading system.

13. The optical symbol reading system of claim 1, wherein:
the various types of illumination include emitting either direct or diffuse illumination based on the illumination parameters; and
the control circuitry is further operative to autonomously determine the illumination parameters to set a diffusion type based on at least the determined reflectance of the at least one surface in the target area.

14. The optical symbol reading system of claim 1, wherein the assessed object characteristics that represent reflectance of the at least one surface in the target area are represented as a reflectance map, wherein the reflectance map includes intensity of reflected illumination from different points on the at least one surface in the target area which receive illumination at different angles of incidence.

15. The optical symbol reading system of claim 1, wherein the color-sensing system comprises a set of photosensors arranged to detect various wavelengths of light and the intensities of those wavelengths, wherein the color-sensing system has a color-sensing field-of-view that is limited to a fraction of a field-of-view of the image sensor.

16. The optical symbol reading system of claim 1, wherein the surface-profiling system comprises a multi-zone time-of-flight (ToF) sensor that includes a ranging illuminator and a receiving array of photosensors that is sensitive to the ranging illumination.

17. An automated method for optically reading a symbol, the method comprising:
- measuring certain colors of the visible spectrum present in a target area;
- measuring distances and reflected-light intensity of multiple points of at least one surface in the target area;
- comparing reflected-light intensity values of reflected illumination that is received from the multiple points on the at least one surface to determine a reflectance of the at least one surface in the target area including applying a correction function to each portion of the at least one surface that is offset from a normal axis of the surface-profiling system and for a concave or convex shape of the at least one surface;
- based on the certain colors, on the distances, and on the reflected-light intensity, producing a set of assessed indicia representing at least color, orientation, and reflectance of the at least one surface in the target area;
- determining the illumination parameters based on the set of assessed indicia;
- providing illumination light to the target area in accordance with a selected type of illumination based on illumination parameters;
- capturing a first image of the target area while providing the illumination light, the target area including at least a portion of an object of interest that includes a machine-readable symbol; and
- processing the first image to read the machine-readable symbol.

18. The method of claim 17, wherein providing illumination light to the target area includes providing a selected illumination type from among various types of illumination that include various colors, various levels of brightness, and either direct or diffuse illumination for the illumination light, based on the illumination parameters.

19. The method of claim 17, wherein measuring distances of multiple points of at least one surface in the target area includes measuring a time of flight (ToF) of ranging illumination to the at least one surface.

* * * * *